United States Patent [19]

Bennett et al.

[11] 4,235,830
[45] Nov. 25, 1980

[54] FLUE PRESSURE CONTROL FOR TUNNEL KILNS

[75] Inventors: Robert F. Bennett, Newburgh, Ind.; Warren D. Brown, Pittsburgh, Pa.; Clarence L. Patterson, Newburgh; John C. Sorensen, Rockport, both of Ind.

[73] Assignees: Aluminum Company of America; Pullman Incorporated, both of Pittsburgh, Pa.

[21] Appl. No.: 939,397

[22] Filed: Sep. 5, 1978

[51] Int. Cl.³ .................. B29C 25/00; C01B 31/00
[52] U.S. Cl. .................................. 264/29.7; 201/6; 201/32; 201/37; 201/44; 432/148; 432/209; 432/212
[58] Field of Search .................. 432/148, 209, 212; 201/6, 15, 18, 27, 29, 32, 36, 37, 44; 264/29.6, 29.7

[56] References Cited

U.S. PATENT DOCUMENTS

| | | | |
|---|---|---|---|
| 2,941,927 | 6/1960 | Wilkins | 202/98 |
| 2,983,022 | 5/1961 | Dressler et al. | 264/29.7 X |
| 3,009,863 | 11/1961 | Angevine | 201/32 X |
| 3,540,710 | 11/1970 | Yamagishi et al. | 432/209 X |

OTHER PUBLICATIONS

Griswold, "Fuels, Combustion and Furnaces," McGraw-Hill Book Co., New York, 1946, pp. 369-371, 373-375.

*Primary Examiner*—Arnold Turk
*Attorney, Agent, or Firm*—Elroy Strickland

[57] ABSTRACT

Means and method of operating a tunnel kiln in which green carbon articles are baked in the ware (article) space of a baking zone by heat produced by the combustion of fuel directed to chambers adjacent the zone. The combustion chambers are connected in fluid communication with flues extending lengthwise of the kiln, the flues having a pressure gradient that extends lengthwise of the flues. The method of the invention includes the step of changing the pressure gradient within the flues such that a pressure differential between the combustion chambers and the ware space is effected that causes products of combustion to flow into the ware space from the combustion chambers in amounts sufficient to impede and prevent the deposition of coke formations on the walls of the space without burning the carbon articles. This change in the pressure gradient is effected by (1) placing exhaust stacks in fluid communication with the flues at locations in the combustion chambers and, (2) regulating ware space pressures and flow with existing equipment to balance the ware space in relation to the flues.

2 Claims, 3 Drawing Figures

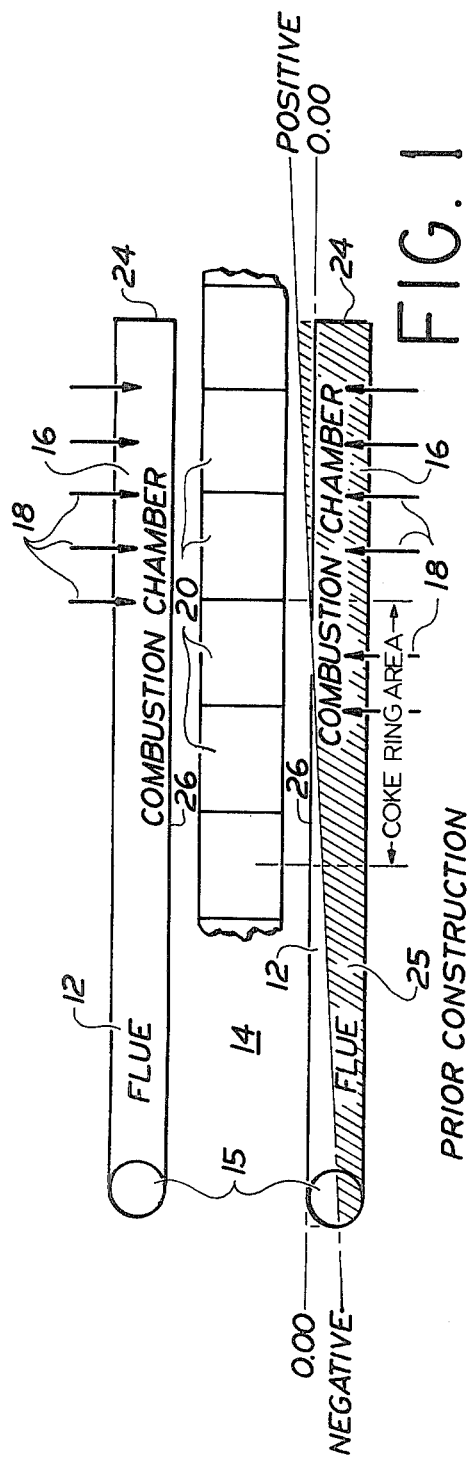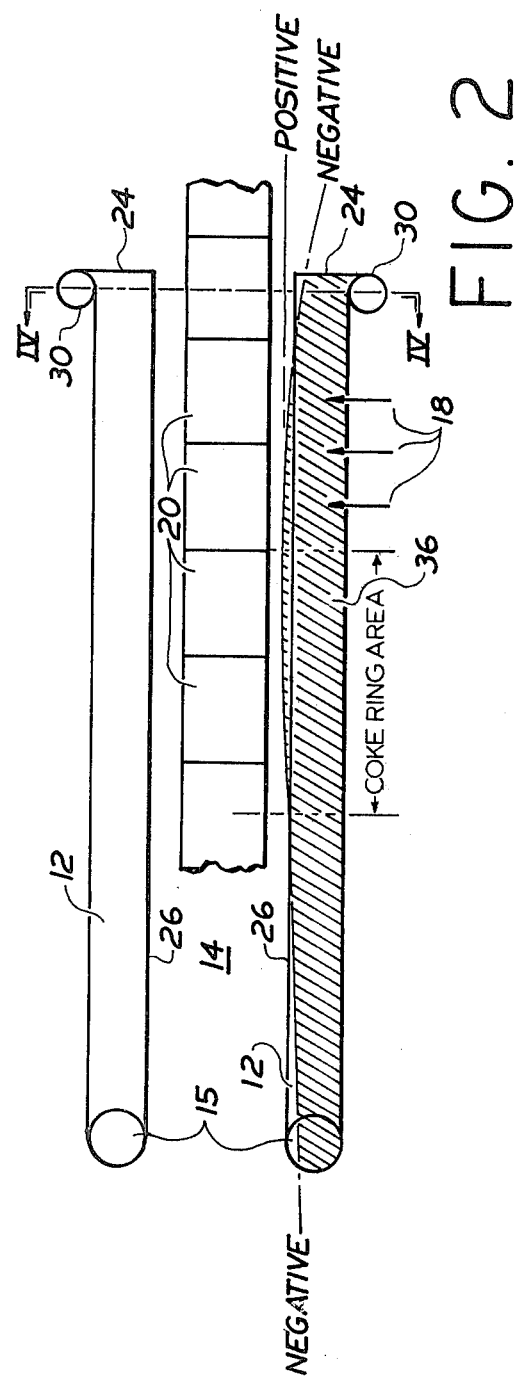

FLUE PRESSURE CONTROL FOR TUNNEL KILNS

BACKGROUND OF THE INVENTION

The present invention relates generally to tunnel kilns employed in the process of baking carbonaceous products, and particularly to a method that impedes and prevents the deposition of coke on the walls of the ware space of such kilns without adverse effect on the carbonaceous products themselves.

As is well known in the art of baking carbon articles, such as electrodes used in electrolytic cells for making aluminum, plastic carbon aggregate and organic binder formulations comprise the green, unbaked carbon electrodes, the binder formulations including such aromatic elements as petroleum or coal tar pitch with or without the addition of commercial additives such as fillers and plasticizers. The organic binders that have been found satisfactory in the practice of baking carbon electrodes in tunnel kilns generate substantial quantities of volatile gaseous hydrocarbons and soot. These hydrocarbons and soot circulate in the ware space of the baking zone of the kiln and come in contact with the side walls of the baking zone. These walls, which can be porous, separate the baking zone from combustion chambers, located on opposed sides of the baking zone, such that these walls are quite hot, the temperature of the walls reaching a maximum of 1300° C. When the gases contact the hot walls, the gases crack into hydrogen or lighter hydrocarbons and coke, with the coke depositing on the inwardly facing surfaces of the walls. These coke deposits are known as "the coke ring", and are of very hard variety resembling pyrolitic coke. Unless the deposits are removed, they will grow inwardly in the tunnel kiln and ware space and eventually obstruct and interfere with the passage of the carbon articles through the kiln. Thus, the operating life of the kiln is substantially reduced.

As is further well known, the operation of a tunnel kiln requires a pressure gradient in longitudinal flues of the kiln between the combustion chambers of the flues and the exhaust stacks located adjacent the beginning or entrance end of the kiln. The pressure gradient is necessary in order to remove products of combustion (i.e. carbon dioxide, water vapor, etc.) produced in combustion chambers of the flues, as the combustion chambers and flues dead-end at the downstream end of the baking zone. Heretofore, the gradient in the flues, and the resulting pressure differential between the ware space of the baking zone and the combustion chambers, have been controlled to prevent the burning of the products in the ware space of the baking zone. This has resulted in a pressure condition in the baking zone that not only does not limit or prevent the formation of the coke ring on the walls of the baking zone but, in addition, strings out the coke ring over a substantial distance on the walls of the furnace, the ring trailing off to zero deposition as the pressure differential reaches a positive value.

In U.S. Pat. No. 3,009,863 to Angevine, a variety of means is suggested for maintaining a positive pressure condition in the flues relative to the pressure in the portion of the kiln tunnel for baking carbon articles for the purpose of selectively burning the coke ring. Such means include the use of dampers or valve mechanisms in the exhaust lines from the flues to the exhaust stacks, adjustment of external sources of pressurizing atmosphere and variation of secondary air introduced to the flues adjacent the areas of coke deposit, incorporating restrictions or baffles within the flues at desired locations along their length, or by combinations of any two or more of such means. As an alternative to such means, the text of the patent suggests the use of intermittently operated steam jets for admitting steam to the baking area in amounts sufficient to support combustion of coke and soot.

Such means have only been partially successful in selectively burning the coke ring on the walls of the flues in the baking zone. This is true even with the use of tar collecting equipment associated with the lower temperature, preheating sections of the kiln. In the preheating sections, the binder in the electrodes is devolatilized into coke, which produces lower-boiling volatiles in the preheating area, and to a lesser degree in the high temperature baking zone. These volatiles include heavy tars and oils and fluoride salts which are collected by condensers and electrostatic precipitators for the purpose of removing such tars, oils and salts from the kiln gases. Such cleaning means have been troublesome to operate and allow accelerated growth of coke ring when not in operation. The sweep gas or main flow down the length of the tunnel is not capable of complete removal of the residual tars and oils and therefore, they are present in the kiln gases to crack and deposit on the walls of the baking zone. Hence, there is still the need for an effective, reliable means to control the ingress of combustion products into the baking zone for the purpose of impeding and preventing such deposits without burning the carbon articles in the baking zone.

SUMMARY OF THE INVENTION

The present invention changes (evens) the gradient in the flues adjacent the baking zone without sacrificing the ability of the flues to remove combustion products from the combustion zone, the evened gradient establishing a positive pressure condition on the combustion side of the flue walls of the baking zone such that products of combustion are directed through the walls into the baking zone in amounts sufficient to burn and consume only the coke deposits and volatiles in the baking zone. In this manner, burning of the carbon articles in the baking zone is prevented, and the hydrocarbons which reach the ware space of the hotter baking zone are consumed in the burning process. This is accomplished by the use of exhaust stacks located at the combustion chambers of the flues, the stacks being also in the higher temperature areas of the baking zone (above 800° C). The new exhaust stacks are provided with valve means to assist in the controlling of pressures. Dampers or valve mechanisms or other restrictions or baffles in the flues, external sources of atmosphere control, and secondary air and heat sources directed into the flues adjacent the area of coke deposit can be used as supplements to the additional exhaust stacks in preventing coke ring buildup.

THE DRAWINGS

The invention, along with its objectives and advantages, will best be understood from consideration of the following detailed description and the accompanying drawings in which:

FIG. 1 is a diagrammatic plan view of a portion of a tunnel kiln constructed in accordance with prior practice;

FIG. 2 shows diagramatically the tunnel kiln of the invention providing appropriate pressures in combustion chambers relative to the baking area of the kiln.

PREFERRED EMBODIMENT OF THE INVENTION

Figure 3:
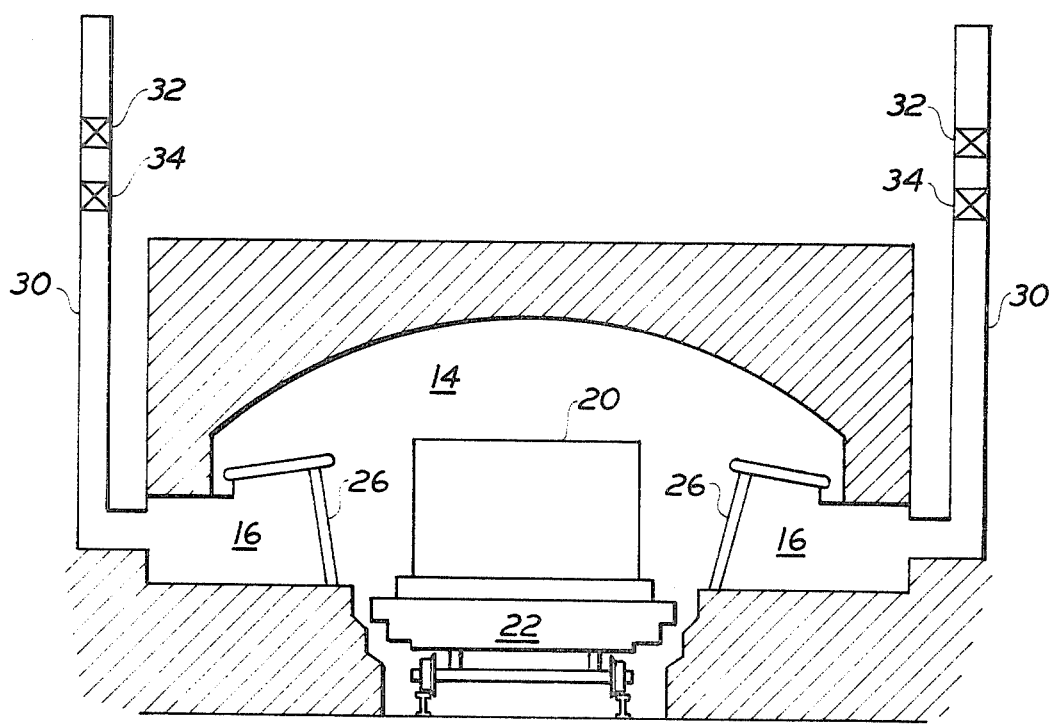
FIG. 3 is a sectional view taken along lines IV—IV of the kiln of FIG. 2.

Referring now to the drawings, FIG. 1 thereof shows schematically the present state of the art in regard to tunnel kilns for baking green carbon articles, the kiln of FIG. 1 being a plan view. Generally, continuing with FIG. 1, tunnel kilns employ two longitudinally extending flues 12, one on each side of the ware space (14) of the kiln. The flues, and two exhaust stacks 15 connected respectively to the flues, remove the products of combustion from combustion chambers 16. The combustion chambers burn hydrocarbon fuels supplied by burner arrangement 18, diagrammatically represented by arrows extending into the chambers in FIG. 1, to heat and bake carbon wares or articles 20 located in and moving through ware space 14. The wares or articles 20 are shown only diagrammatically in FIGS. 1 and 2. In FIG. 3, the wares are disposed on a car 22 that is moved through the ware space for the baking process.

The combustion chambers 16, as indicated in FIGS. 1 and 2, are actually integral portions of the flues 12, the flues extending between exhaust stacks 15, located near the entrance end of the kiln, and end walls 24 of the combustion chambers which terminate the flues at the end of the baking zone. Because of the location of the exhaust stacks, a pressure gradient exists in and along the length of each flue which directs the products of combustion along the flues to the exhaust stacks. In FIG. 1, this gradient is indicated in the lower flue of the kiln by hatched area 25 extending lengthwise of the flue. At the beginning of the flue, the pressure of the products of combustion, as shown in FIG. 1, is negative with respect to the pressure in the ware area 14, using the inside wall (26) of the kiln as a reference line to designate zero pressure. However, in moving toward the end wall 24 of the combustion chambers 16, pressure in the flues gradually increases until it is above the pressure in ware space 14.

The opposed sides of ware space 14 of the kiln are separated from flues 12 and combustion chambers 16 by the above walls 26. Walls 26 are generally porous structures such that there is fluid communication between the ware space and the flues and combustion chambers. In the present invention, the porosity of walls 26 is employed to effect selective burning of coke and soot in the ware space of the baking zone in a manner presently to be explained. However, fluid communication between the ware space and flues may also be achieved by designed openings in the overall construction of the walls 26.

In accordance with the principles of the invention, two exhaust stacks 30 are located at the end walls 24 of the combustion chambers 16 and in fluid communication with the flues and combustion chambers, as shown in FIG. 2. Stacks 30 allow exhaust to be removed from the combustion chambers 16 and the exhaust gas is available for use as both an inert gas supply and for heating purposes. The pressure gradient in the flues is more easily controllable, via the use of valves (32 and 34 in FIG. 3) in stacks 30, thus providing a pressure differential between combustion chambers 16 and ware space 14 which is sufficient to cause the flow of the products of combustion through walls 26 into the ware space to burn the coke and volatiles in the ware space. This differential and pressure gradient are shown by the hatched area 36 in the lower flue of the kiln in FIG. 2. As a result of the burning of coke and volatiles in the ware space, hydrocarbons are eliminated, and no appreciable oxygen is left in the exhaust gases such that the exhaust gases are inert and clean for further use, as mentioned above.

Referring now to FIG. 3, the invention preferably employs an adjustable valve 34 in stacks 30 to establish the gradient in flues 12 that, in turn, precisely establishes the pressure differential between ware space 14 of the baking zone and combustion chambers 16. More particularly, valves 34 are adjusted to establish a pressure value in the combustion chambers on the order of 0.001 to 0.5 inch of water above that pressure in the areas of coke deposits in the baking zone of the ware space. Such a pressure has been found to provide a flow of the products of combustion into the ware space in amounts sufficient to burn and consume the coke deposits on walls 26 and hydrocarbons entrained in the kiln gases, without burning the carbon articles 20 in the baking zone. More particularly, with such a pressure value, the products of combustion, when entering the ware space of the baking zone, first make contact with the coke deposited on the inside face of walls 26, if any is present, and, at the operating temperatures in the baking zone, the coke deposits are consumed by oxidation. Passage of gaseous products from flues 12 into the baking zone of 14 also provides an oxidizing medium which consumes the volatiles generated during the baking process. Any additional amounts of products entering from the combustion chambers 16 cannot be tolerated, as such additional amounts would be available to burn the carbon articles 20. The setting of valves 34 in stacks 30 provides the precise pressure differential between 14 and 16 to effect the burning of combustibles in 14 in the manner described. As indicated further by the hatched area in FIG. 2, the stacks 30, with proper adjustment of valves 34, change the pressure gradient in flues 12 from that of the extremes of the gradient provided in prior kiln constructions, as depicted in FIG. 1, to a more even gradient, with the positive pressure value in combustion chambers 16 located astraddle the coke ring area. Valves 32 are provided as manually operated back-up valves.

Another advantage flowing from this change in the pressure gradient is that any coke ring that may yet tend to form is impeded. The time required for such deposits to reach a significant degree of thickness and accumulation is substantially increased over that of the prior construction, thereby permitting substantially longer runs of kiln and improved thermal efficiency.

While the invention has been described in terms of a preferred embodiment, the claims appended hereto are intended to encompass all embodiments which fall within the spirit and scope of the invention.

Having thus described the invention and certain embodiments thereof, what is claimed is:

1. A method of operating a tunnel kiln in which green carbon articles are baked in the ware space of a baking zone by heat produced by the combustion of fuel in chambers adjacent the baking zone, and having walls that separate the chambers from the ware space, the combustion chambers being connected in fluid communication with flues extending lengthwise of the kiln and adapted to remove products of combustion from the chambers, the flues having a pressure gradient that extends lengthwise of the flues and combustion chambers, the method comprising the steps:

baking carbon articles in the baking zone such that hydrocarbon gases are produced from an organic binder in the articles, which gases contact the surfaces of the walls of the combustion chambers facing the carbon articles, the temperature of said surfaces being such that the hydrocarbon gases tend to crack on the surfaces and leave deposits of coke on the surfaces; and controlling the pressure gradient within the flues and the pressure in the ware space such that a pressure differential between the combustion chambers and the ware space is effected that causes products of combustion to flow into the ware space from the combustion chambers in amounts sufficient to burn and consume coke deposits without burning the carbon articles;

the step of controlling the pressure gradient in the flues including the placing of exhaust stacks in fluid communication with the flues at locations in the combustion chambers of the flues.

2. The method of claim 1 in which the step of changing the pressure gradient in the flues is effected by adjustment of controllable valves located within the exhaust stacks in conjunction with existing exhaust systems.

* * * * *